Oct. 9, 1928.
H. R. VAN DEVENTER
WINDSHIELD WIPER
Filed June 10, 1924
1,686,673
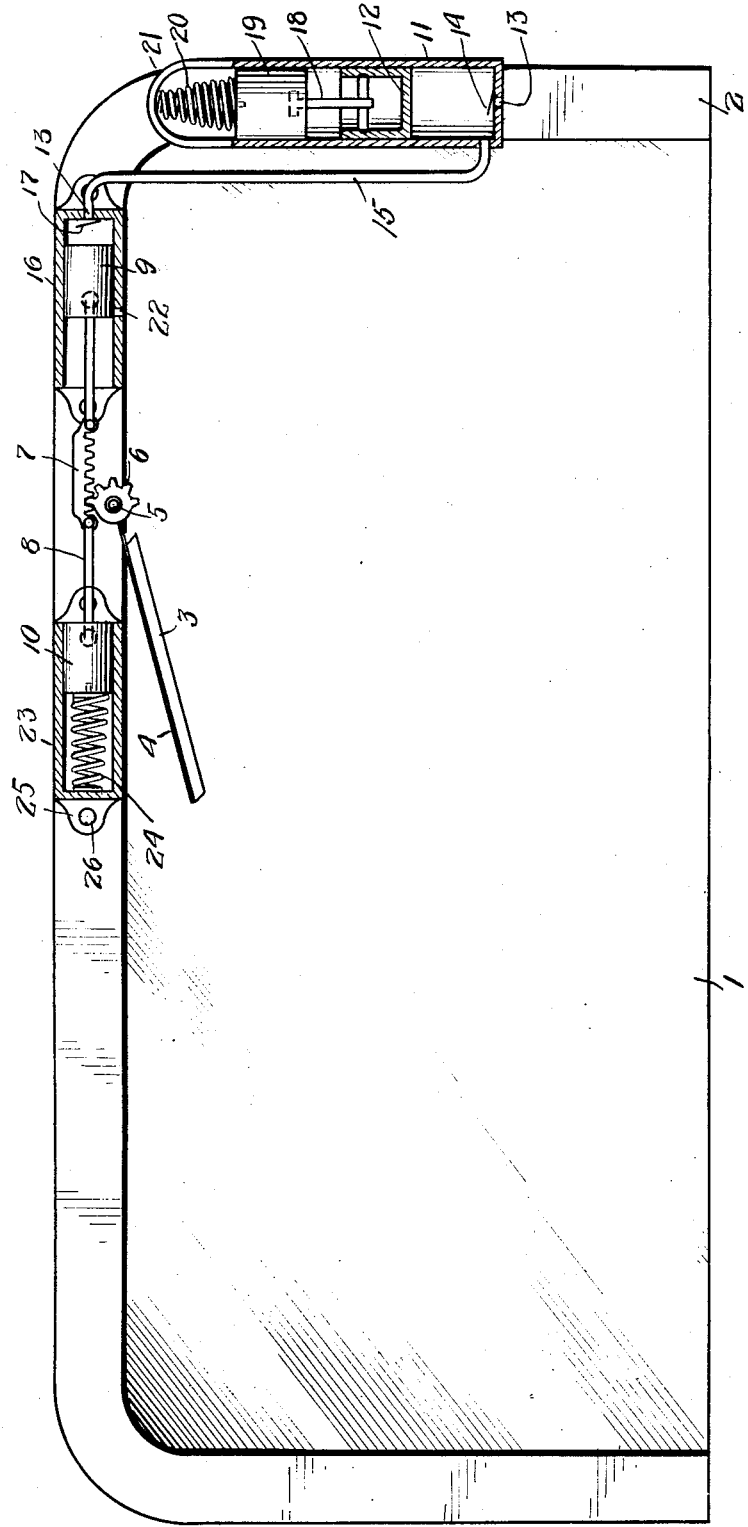
INVENTOR
Harry R. Van Deventer Patented Oct. 9, 1928.

1,686,673

UNITED STATES PATENT OFFICE.

HARRY R. VAN DEVENTER, OF NEW YORK, N. Y.

WINDSHIELD WIPER.

Application filed June 10, 1924. Serial No. 719,141.

I have invented an improvement in windshield wipers intended chiefly for use upon the windshields of automobiles, trucks and other vehicles, for the purpose of clearing the windshield of moisture and water in rainy weather and thus prevent the obstruction of the view of the driver.

Heretofore, windshield wipers have been made to be operated either by hand or by suitable mechanism controlled either by the motor or some of the accessories thereof, or of the car itself; and such mechanism has always made the device somewhat complicated, expensive and bulky. My invention is of the automatic type requiring no attention from the driver, yet it enables me to dispense with all of the usual appliances heretofore employed to actuate the wiper and clear the water off the windshield, the entire improvement being self-contained, simple in construction and efficient, and capable of operating for an indefinite period; the energy to bring about the operation of the wiper being supplied by and dependent upon solely the motion of the body of the vehicle; so that the wiper will be constantly in service as long as the vehicle remains in use.

The nature and objects of the invention will be apparent from the following description taken in connection with the drawing upon which the best form of my invention now known to me is illustrated; and I, of course, reserve the right to make changes in details which are embraced within the scope and spirit of the invention, as the same is defined in the appended claims.

On the drawings,

The figure is a front or outside view of a windshield carrying a wiper, with means for operating the wiper according to my invention.

The windshield is shown as comprising a pane of glass 1, having a rim 2, and to clear a portion of the surface of the windshield in front of the driver's seat, I provide a wiping strip 3, which may be, of felt or rubber secured to a bar 4 mounted upon a pivot pin 5 affixed to the top of the rim 2. This bar 4 may be made integral or rigid with a pinion or segmental gear 6 meshing with a rack bar 7 carried by a rod 8. Obviously, as the bar 7 moves back and forth or reciprocates, the motion thereof will be transmitted to the pinion 6, and the bar 4 with the strip 3, be caused to swing from one side to the other so as to clean off a large area of the upper part of the glass 1, and give the driver a clear view through the glass, of the road or street in front of the car.

To cause reciprocation of the bar 7, I provide means for utilizing energy due to the motion of the body of the car such as the swaying or bouncing of the chassis when the car is in progress, such means acting to store this energy and periodically release it while simultaneously swinging the bar 4 and the wiping strip 3 from one side to the other. Such means comprises a piston 9 attached to one end of the bar 7, and a piston or plunger 10 attached to the opposite end, the piston 9 being urged by compressed air in one direction and while so moving it acts to impel the piston 10 against the force of a spring to store up energy, and when this energy is released, the piston 10 acts to move the bar 7 in the opposite direction and return the piston 9 to its original position, thereby oscillating the bar 4 in the manner required. For this purpose, I mount upon the rim 2 at the end of the windshield adjacent the driver's seat a cylinder 11 containing a movable piston 12 and having an inlet port 13 controlled by a one-way inlet valve 14.

This cylinder 11 also has an outlet port leading to a discharge pipe 15 which connects the cylinder 11 to a cylinder 16 at the top of the windshield, adjacent the same side, and containing the above-mentioned piston 9. This cylinder 16 also has an inlet port 13 to which the pipe or conduit 15 leads and this inlet port is controlled by a one-way inlet valve 17 similar to the valve 14. Hence, as the piston 12 moves up and down, air is drawn into the cylinder 11 and forced through the pipe 15 into the cylinder 16 to move the piston 9 therein out and swing the bar 4 and wiping strip 3 over towards the cylinder 11.

Attached to the piston 12 is a connecting rod 18 joining this piston to a weight of considerable mass 19 in the upper end of the cylinder 11. This weight is attached by a spring 20 to a yoke 21 at the top or open end of the cylinder 11 and is freely suspended by this spring 20 so that it can move up and down to actuate the piston 12. As the automobile or other vehicle is traveling, the swaying of the body of the car and the bouncing motion it receives as it passes over inequalities and projections upon the earth's surface will cause the weight 19 to fly up and down in the cylinder 11 and thus constantly pump air into the cylinder 16, to actuate the piston 9. This piston 9 will move out in the cylinder 16 till the inner end thereof arrives at an outlet port 22 in the side of the cylinder 16, and as soon as it overruns this port, the pressure of the air in the cylinder 11, the pipe 15 and the cylinder 16, at once drops to atmospheric pressure because all of the compressed air stored up by the action of the piston 12 under the influence of the weight 19 is then at once discharged through the overrun port 22.

The piston 10 secured to the other end of the rod or member 8 is contained in an open-ended cylinder 23 secured to the top of the rim 2 and works against the coil spring 24 in this cylinder. Hence, when the piston 9 is forced outward in the cylinder 16 to swing the wiper from left to right with reference to the position of the parts shown in Figure 1, the piston 10 compresses the spring 24 and considerable energy is then stored in this spring. When, however, the port 22 is exposed by the piston 9, the energy of the spring 24 is released and the piston 10 is then forced back in an outward direction with reference to the cylinder 23, and the member 8 is moved to actuate the wiper and cause it to swing back to the position it occupies in Figure 1. Thus the wiper is caused to move repeatedly from side to side and keep that part of the glass 1 in front of the driver's face clean and clear.

The cylinder 23 is shown as provided with lugs 25 having openings to receive fastening devices 26 to enable it to be secured to the rim 2, and similar means may be employed to attach the cylinders 11 and 16.

It is only necessary to make the capacity of the cylinder 11 and the pipe 15 large with respect to the capacity of the cylinder 16 and while giving the weight sufficient mass, and to design this weight and the spring 20 suspending it, so that the range of movement of this weight and the piston 12 will not be too large. Then the spring 24 can always act to force the piston 10 out far enough to cause the wiper to swing from one end of its arc to the other, upon the release of the air pressure in the cylinders 11 and 16 through the port 22 when this port is exposed, the spring 24 being adapted to act to force the piston 9 back to its original position before sufficient air under pressure can again be obtained in the cylinder 11, the pipe 15 and the cylinder 16, so that the air pressure remaining in the cylinder 11 and cylinder 16 when the piston 9 is forced back to cover the part 22, will not be great enough to interfere with or obstruct the action of the spring 24. In other words, the spring 24 will act to move the wiper quickly, to swing it from right to left when viewed from the front or outside of the windshield; while the effect of the weight 19 may cause the air pressure to rise with relative slowness in the cylinders 11 and 16 and the piston 9, to move more slowly, to carry the wiper from left to right. Obviously, the various parts can be so designed that the wiper will act often enough passing back and forth over the outside of the glass 1, to prevent the accumulation of sufficient moisture on the glass to interfere with the driver's vision.

Of course, the wiper does not have to be pivoted, or connected by rack and pinion to the bar 4. Other modes of connection are readily apparent.

Having described my invention, what I believe to be new and desire to secure and protect by Letters Patent of the United States is:—

1. A windshield wiper mounted on a vehicle and comprising a bar carrying a wiping strip, a member to actuate said strip, a piston to move said member in one direction, a pumping cylinder to supply air under pressure to operate said piston, a yieldingly suspended weight to be actuated by irregularities of motion of said vehicle, said weight being associated with said pumping cylinder, a spring to be compressed by the piston and a valve permitting the spring to move the bar in the opposite direction.

2. A windshield wiper mounted on a vehicle and comprising a pumping cylinder, a weight yieldingly suspended to be moved in said cylinder by vibrations of the vehicle, a piston in said pumping cylinder connected to said weight, a second cylinder in communication with the pumping cylinder, a piston in said second cylinder, said second cylinder having a port to be over-run by the piston therein, a wiping strip adjacent to and operatively connected to the piston of the second cylinder, a third cylinder containing a spring, and a plunger in said third cylinder and connected to said bar to compress said spring, whereby the pumping cylinder will cause the movement of the piston in the second cylinder to compress the spring in the third cylinder and move the wiping strip in one direction; the wiping strip being moved in the opposite direction by the spring when the piston in the second cylinder overruns said port therein.

3. A windshield wiper mounted on a vehicle and comprising a part carrying a wiping strip, a member responsive to air pressure to actuate said part; a mechanism to supply air pressure to said member by means of oscillations of the body of said vehicle, a spring arranged to be compressed by movement of said member and a valve to permit the spring to move the member in reverse direction.

4. In a windshield cleaner for automobiles and the like, the combination of a wiper adapted to be mounted for movement over the glass, driving means for the wiper comprising a counterbalanced weight mounted for free movement on said automobile and adapted to be actuated by the vibrations thereof, and a motion translating device interposed between said weight and said wiper, said device comprising pistons and piping to permit movement of fluid to actuate the wiper.

5. In a windshield cleaner for automobiles and the like, the combination of a wiper, driving means for the wiper mounted for free movement on the automobile and adapted to be actuated by the vibrations thereof, said means comprising a weighted spring-balanced member, and apparatus utilizing fluid pressure for translating the movement of said member to actuate the wiper.

6. A wiper construction for automobile windshields comprising a wiper strip mounted for reciprocation, and drive means operatively connected with said wiper strip including a vibratory member actuated by the bouncing motion of the automobile carrying the windshield for effecting reciprocation of the wiper strip over the surface of the windshield glass.

7. In a windshield cleaner for automobiles and the like, the combination of a wiper adapted to be mounted for movement over the glass, driving means for the wiper comprising a counterbalanced weight mounted for free movement on said automobile and adapted to be actuated by the vibrations thereof, and motion translating mechanism interposed between said weight and said wiper to actuate the latter.

8. In a windshield cleaner for automobiles and the like, the combination of a wiper, driving means for the wiper mounted for free movement on the automobile and adapted to be actuated by the vibrations thereof, said means comprising a weighted spring-balanced member, and mechanism for translating the movement of said member to actuate the wiper.

In testimony whereof I affix my signature.

HARRY R. VAN DEVENTER.